United States Patent
Yoshida et al.

[11] Patent Number: 5,282,042
[45] Date of Patent: Jan. 25, 1994

[54] STROBE CONTROL METHOD AND APPARATUS FOR USE IN PSEUDO-FRAME PHOTOGRAPHY

[75] Inventors: Masanori Yoshida; Kiyotaka Kaneko, both of Tokyo; Issei Kobayashi, Yokohama, all of Japan

[73] Assignee: Fuji Photo Film Co., Ltd., Kanagawa, Japan

[21] Appl. No.: 766,402

[22] Filed: Sep. 27, 1991

[30] Foreign Application Priority Data

Sep. 28, 1990 [JP] Japan ................... 2-257010

[51] Int. Cl.⁵ .................. H04N 3/14; H04N 5/335
[52] U.S. Cl. .................. 358/213.19; 358/213.13; 358/213.26; 354/416
[58] Field of Search .............. 358/227, 213.19, 228; 354/126, 145.1, 413, 416

[56] References Cited

U.S. PATENT DOCUMENTS

| | | | |
|---|---|---|---|
| 4,635,123 | 1/1987 | Masunaga et al. | 358/213 |
| 4,805,037 | 2/1989 | Noble et al. | 358/335 |
| 4,963,985 | 10/1990 | Isoguchi et al. | 358/227 |

Primary Examiner—Michael T. Razavi
Assistant Examiner—Joseph Colaianni, Jr.

[57] ABSTRACT

A strobe control method is provided for use in an image pick-up system which performs pseudo-frame photography by staggering, for a prescribed short period of time, the timings at which the photoelectric transducers of a first field and the photoelectric transducers of a second field are cleared in solid-state electronic image sensing devices, and staggering, between the first and second fields and for the aforementioned prescribed short period of time, the timings at which electric charges are read from these photoelectric transducers. The strobe control method includes steps of controlling strobe-light emission in such a manner that the start timing of strobe-light emission occurs after the processing for clearing both fields, and forcibly stopping strobe-light emission for a requisite period of time before charge readout timing of the first field.

4 Claims, 5 Drawing Sheets

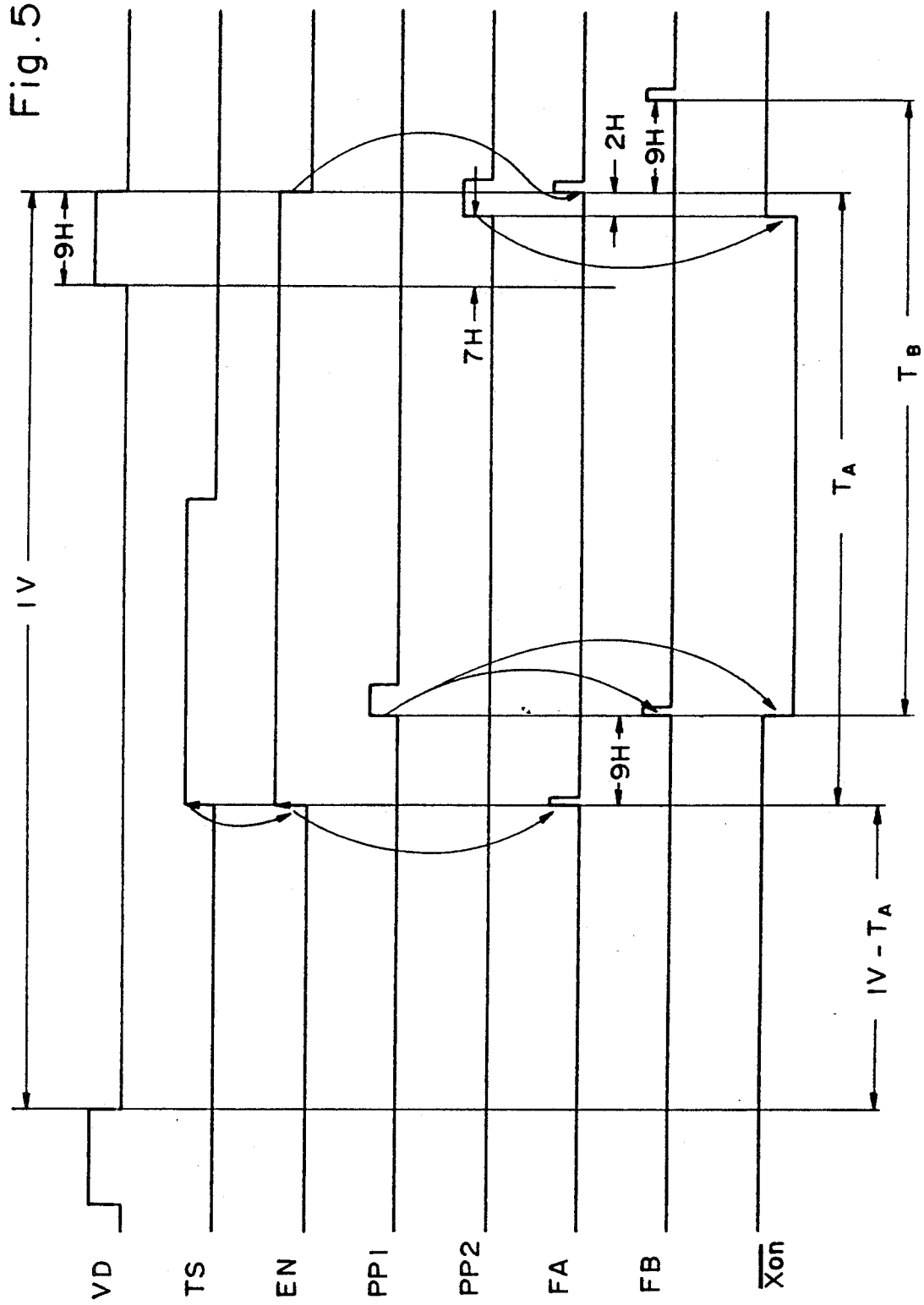

STROBE CONTROL METHOD AND APPARATUS FOR USE IN PSEUDO-FRAME PHOTOGRAPHY

BACKGROUND OF THE INVENTION

1. Field of the Invention

This invention relates to a method and apparatus for controlling the start and stop timing of a strobe light emission when performing so-called pseudo-frame photography using a solid-state electronic image sensing device.

2. Description of the Related Art

When a special solid-state electronic image sensing device such as a frame interline transfer (FIT) CCD or the like is used, so called pseudo-frame photography can be performed. Though the details of pseudo-frame photography will be described later, in brief, the term refers to offsetting slightly the exposure time period of a first field and the exposure time period of a second field and setting the lengths of these two time periods to be equal. Since this technique makes it possible for the exposures of the two fields constituting a frame to be performed substantially simultaneously, there is almost no shift in the image between fields even if the subject photographed varies with time (as when the subject exhibits motion). In addition, since the exposure time is the same for both fields, the occurrence of flicker or the like is prevented. Moreover, since the read timing of the signal charge of the first field and the read timing of the signal charge of the second field are offset slightly, the signal charges of the two fields can be extracted separately, i.e., without being mixed.

When a strobe is fired in such pseudo-frame photography, the timing for firing the strobe is very difficult. The reason is that when the quantity of light reflected from a subject irradiated with strobe light differs for the first and second fields, this causes flicker to occur. It is required that the exposure by the strobe be made the same for the first and second fields constituting a frame.

SUMMARY OF THE INVENTION

An object of the present invention is to provide a control method and apparatus whereby exposure can be made the same for first and second fields when a strobe is used for the pseudo-frame photography described above.

An image pick-up system for performs pseudo-frame photography by staggering, for a prescribed short period of time, the timings of clearing processing applied to photoelectric transducers of a first field and photoelectric transducers of a second field in solid-state electronic image sensing devices, and staggering, between the first and second fields and for the aforementioned prescribed short period of time, timings at which electric charges are read out from these photoelectric transducers. A strobe control method according to the present invention includes steps of controlling strobe-light emission in such a manner that start timing of strobe-light emission occurs after processing for clearing both fields, and forcibly stopping strobe-light emission for a requisite period of time before charge readout timing of an initial field.

Also an image pick-up system performs pseudo-frame photography by staggering, for a prescribed short period of time, the timings of clearing processing applied to photoelectric transducers of a first field and photoelectric transducers of a second field in solid-state electronic image sensing devices, and staggering, between the first and second fields and for the aforementioned prescribed short period of time, timings at which electric charges are read out from these photoelectric transducers. A strobe control apparatus according to the present invention comprises start command generating means for generating a strobe-light emission start command in response to a clearing signal of a field cleared second, and stop command generally means for generating a strobe-light emission stop command for forcibly stopping strobe-light emission for a requisite period of time before charge readout timing of a first field.

Exposure is started by processing for clearing the photoelectric transducers. This operation is equivalent to opening the shutter. Exposure is ended by starting the readout of the electric charge from the photoelectric transducers. This operation is equivalent to closing the shutter. Accordingly, the time period from clearing processing to charge readout is the exposure time. The exposure time period of the first field and the exposure time period of the second field are staggered relative to each other by the aforementioned prescribed short period of time.

In accordance with the present invention, control is exercised in such a manner that the strobe emits light only for the period of time during which the slightly staggered exposure time periods of the first and second fields overlap each other. Accordingly, irrespective of the strobe flash waveform, the exposure produced by flashing the strobe (namely the amount of irradiation received by the subject) is the same for both the first and second fields and flicker is prevented before it occurs.

The present invention is especially effective in a case where the length of the time period during which the exposure time periods of the two fields overlap is shorter than the strobe-light emission time (the time from the start of strobe-light emission to the extinction of residual light). In accordance with the invention, strobe light emission is halted at a point in time slightly before the end of the exposure time period of the first field. This makes it possible to avoid a situation in which, after the exposure time period of the first field ends, only the second field is exposed by the strobe flash in the exposure time period of the second field, which follows the first field.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a time chart showing the operation of the circuit illustrated in FIG. 4.

DESCRIPTION OF THE PREFERRED EMBODIMENT

The basic concepts of pseudo-frame photography and strobe-light emission control will be described with reference to FIG. 1.

Two fields which constitute a frame shall be referred to as an A field and a B field. First exposure of the A field starts and then, after a prescribed period of time (9H in this embodiment, where 1H represents one horizontal scanning interval), exposure of the B field starts. The offset of 9H between the exposure starting times of the A and B fields is decided upon taking into consideration the time needed for readout and transfer of the signal charge of the A field in a solid-state electronic image sensing device. The exposure time of the A field and the exposure time of the B field are set to be equal. Accordingly, exposure of the B field ends when the time equivalent to 9H elapses from the moment exposure of the A field ends.

The time period during which the strobe emits light is limited to within the time during which the exposure time period of the A field and the exposure time period of the B field overlap, which shall be referred to as a "common time period". More specifically, the strobe begins emitting light at the moment B-field exposure starts (namely at the negative going transition of a strobe control signal $\overline{Xon}$), and the strobe-light emission is terminated forcibly at a moment slightly before the end of A-field exposure. That is, the emission is ended at the positive-going transition of $\overline{Xon}$, which occurs 2H prior to the end of A-field exposure in this embodiment. This time period of 2H is decided upon taking account of the time required for extinction of residual strobe light.

Figure 1:
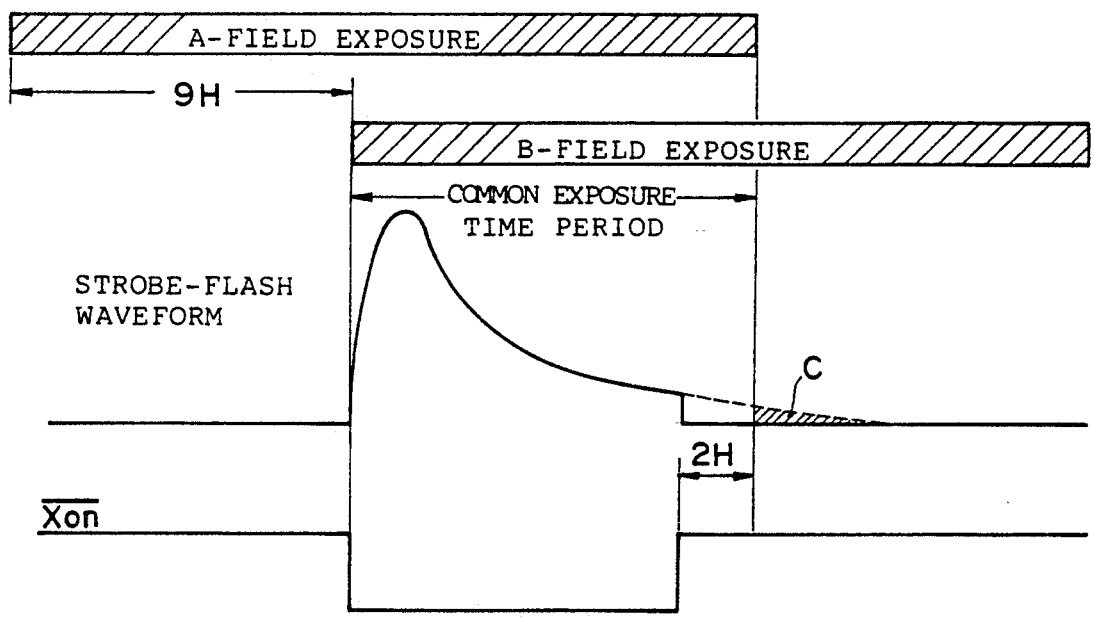
FIG. 1 is a diagram showing the concepts of pseudo frame photography and strobe-light emission control.

As shown in FIG. 1, the waveform of strobe flash rises sharply at the beginning of the light emission and then traces a long, slow decaying tail after peaking. If the time (referred to as "strobe-light emission time") from the moment the strobe-flash waveform rises until the strobe-flash waveformit becomes completely extinct (zero) were to be longer than the aforesaid common exposure time period, only the B field would be exposed by the tail portion of the strobe-flash waveform, as indicated by the shaded portion C in FIG. 1. As a consequence, the exposure of the B field would be greater than that of the A field, and therefore flicker would be produced when the image resulting from image pick-up is played back. According to the present embodiment, this problem does not arise because the strobe-light emission is forced to end prior to the end of exposure of the A field.

It goes without saying that the present invention is applicable also to a so called "dimmer strobe". A dimmer strobe is one which forces a strobe-light emission to end upon passage of a suitable time after the start of the light emission in order to adjust the exposure produced by the emitted light. If the time from the start of the strobe-light emission to the forcible end thereof (this period of time also is referred to as the strobe-light emission time) is longer than the aforesaid common exposure time period, the strobe-light emission is forcibly ended by the forcible termination prior to the forcible termination by the dimmer circuit.

Figure 2:
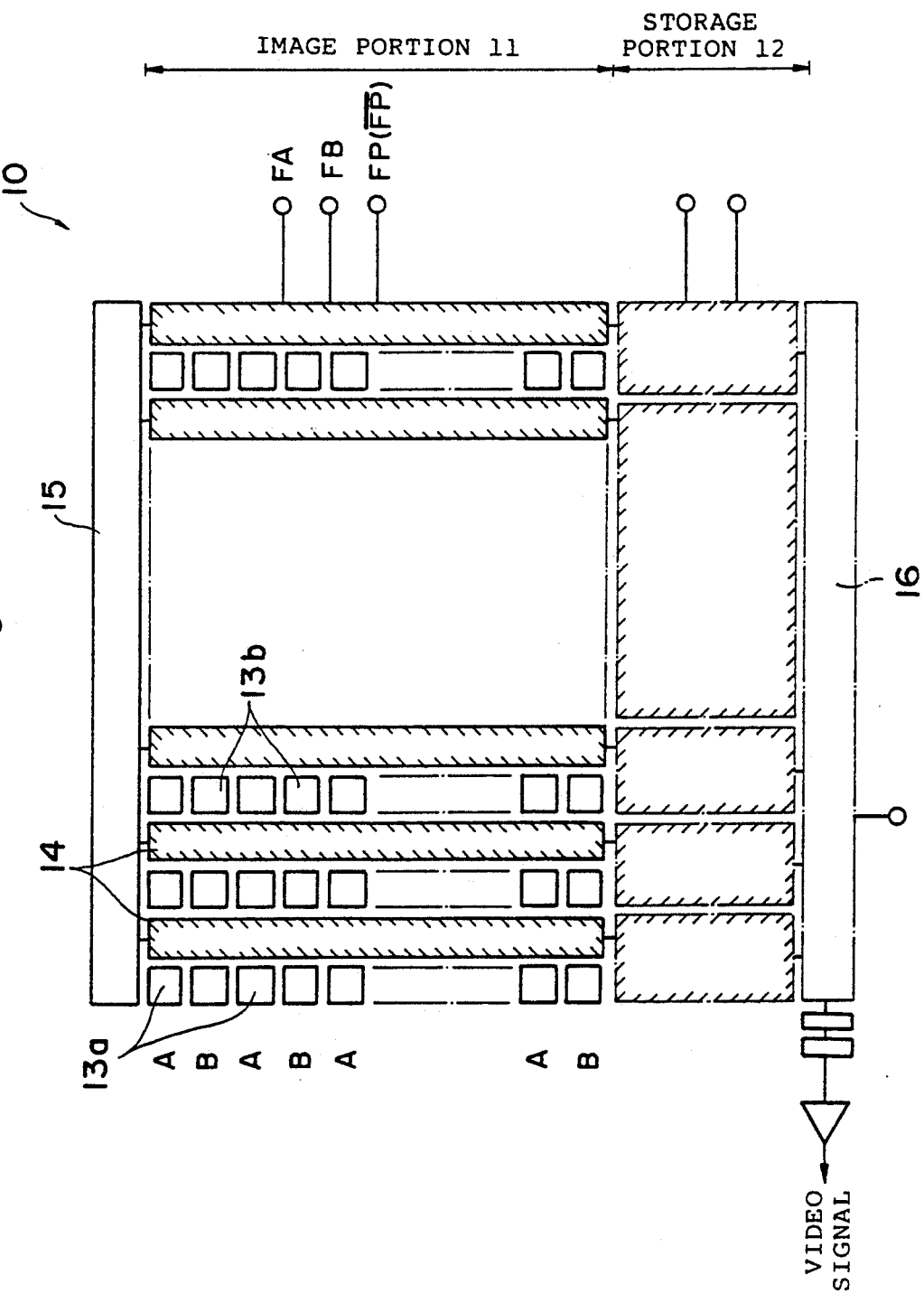
FIGS. 2a and 2b are diagrams showing the construction of a frame interline transfer CCD.

Reference will be made to FIGS. 2a and 2b to describe construction of a frame interline transfer (FIT) CCD as an example of a solid-state electronic image sensing device capable of performing pseudo-frame photography.

An FIT-CCD 10 includes an image portion 11, a storage portion 12, a drain 15 for sweeping out unnecessary electric charge, and a horizontal transfer line 16. The image portion 11 includes a number of photodiodes (photoelectric transducers) 13a, 13b arrayed vertically and horizontally, and vertical transfer lines 14. The odd-numbered rows of the photodiodes 13a construct A fields, and the even-numbered rows of the photodiodes 13b construct B fields. The vertical transfer lines 14 are arranged alongside respective columns of the photodiodes 13. The vertical transfer lines 14 and the storage portion 12 are shielded by an aluminum film. (As shown in FIG. 2b, the periphery of each shielded portion is indicated by hatching.)

Figure 3:
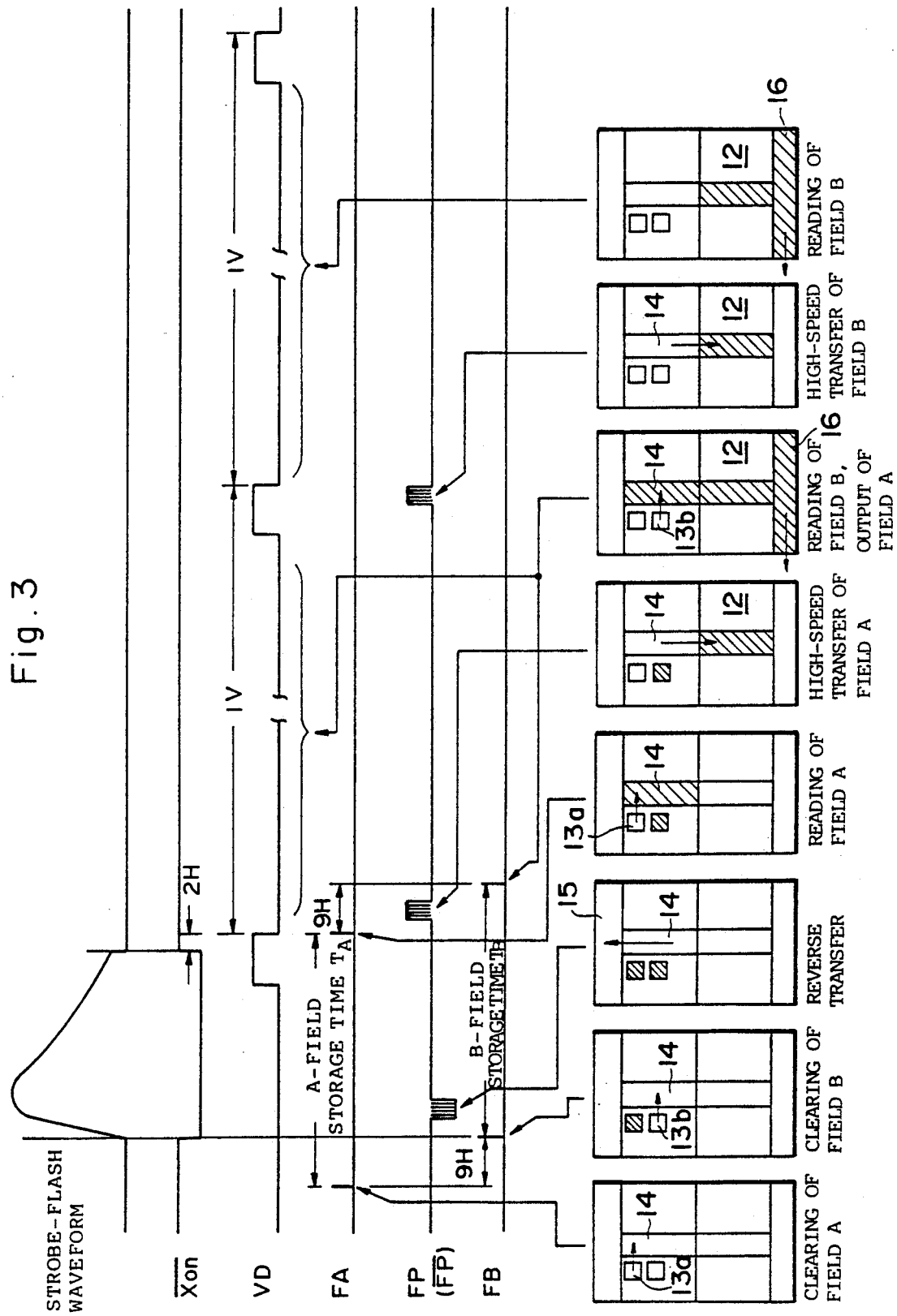
FIG. 3 is a diagram showing the details of pseudo-frame photography and strobe-light emission control.

FIG. 3 illustrates the operation of pseudo-frame photography using the above-described FIT CCD. In this example, the starting time of A-field exposure is decided in such a manner that a video signal of the A field is capable of being outputted in synchronization with vertical and horizontal synchronizing signals within an interval of 1V which immediately follows readout of the signal charge of the A field. That is, exposure of the A field starts at a point in time which precedes the trailing edge of a vertical synchronizing signal by the A-field exposure time (A-field storage time $T_A$).

When a field-shift signal FA for the A field is applied, unnecessary electric charge residing in the photodiodes 13a of the A field is given off from these photodiodes to the vertical transfer lines 14 corresponding thereto. As a result, the A-field photodiodes 13a are cleared (reset) and exposure (charge storage) of the A field starts. Next, after the elapse of time 9H, a field-shift signal FB for the B field is applied, and unnecessary electric charge residing in the photodiodes 13b of the B field is given off from these photodiodes to the vertical transfer lines 14 corresponding thereto. As a result, the B-field photodiodes 13b are cleared (reset) and exposure (charge storage) of the B field starts. The unnecessary charge of the A and B fields given off to the vertical transfer lines 14 is reverse-transferred at high speed to the unnecessary-charge drain 15 by a reverse-transfer pulse $\overline{FP}$.

When the A-field exposure time (storage time $T_A$) elapses following the start of A-field exposure, the field-shift pulse FA for the A field is applied again and electric charge, which represents a photographic image, that has accumulated in each of the A-field photodiodes 13a is read out to the corresponding vertical transfer lines 14. Since this is followed by application of a high-speed transfer pulse FP, the electric charge representing the photographic image read out to the vertical transfer lines 14 is transferred to the storage portion 12 at high speed. Since the vertical scanning interval of 1V starts at this time, the charge transferred to the storage portion 12 is delivered to the horizontal transfer line 16 successively one line at a time by a horizontal drive pulse, which is synchronized to the horizontal synchronizing signal, applied to the storage section 12. Furthermore, the charge in the horizontal transfer line 16 is successively shifted by a pixel clock and outputted as a video signal.

After the elapse of the 9H interval following readout of the A field signal charge [namely after the elapse of B-field exposure time, which is equal to B-field storage time $T_B (= T_A)$, following the start of B-field exposure], the field-shift signal FB for the B field is applied so that the electric charge representing the photographic image stored in each of the B-field photodiodes 13b is read out to the corresponding vertical transfer lines 14, where the charge is then held. At this time the A-field electric charge has already been transferred to the storage portion 12.

All of the signal charge of the A field is outputted over the interval of 1V. When the next vertical scanning interval starts, the B-field signal charge held by the vertical transfer line 14 is transferred at high speed to the storage portion 12 by the high-speed transfer pulse FP, and the charge is delivered from the storage portion 12 to the horizontal transfer line 16 successively one line at a time by the horizontal drive pulse, and the charge is outputted from the horizontal transfer line 16 as a video signal in synch with the pixel clock. The output of the B-field signal charge also is performed over the interval of 1V.

The high-speed transfer and reverse-transfer of the signal charge are performed during the vertical retrace interval or horizontal retrace interval.

As set forth above, the emission of strobe light begins at the start of B-field exposure. If the strobe-light emission time continues beyond the point in time that is 2H prior to the end of A-field exposure, then emission of the strobe light is terminated forcibly at the instant 2H ahead of the end of A-field exposure.

Figure 4:
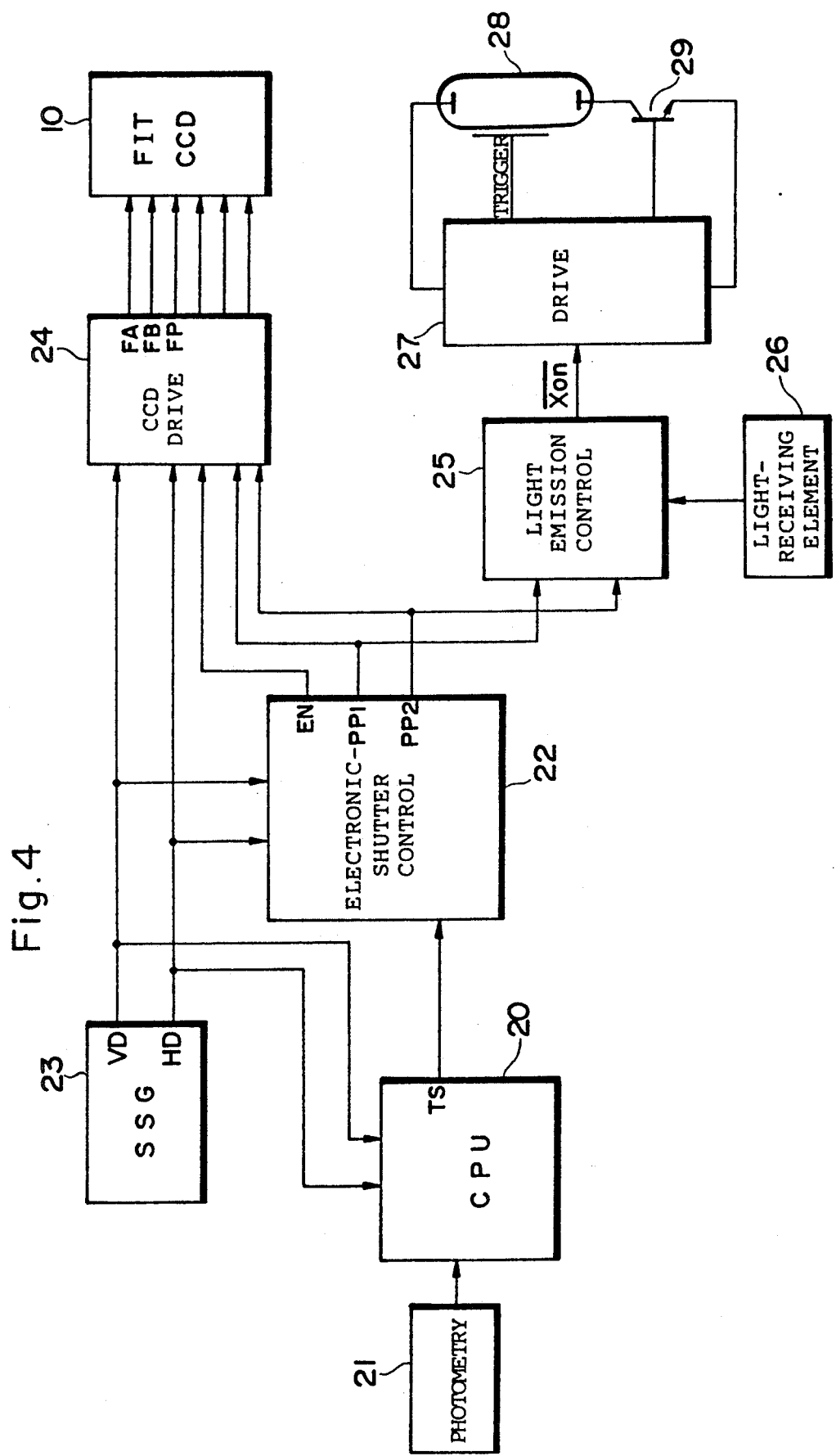
FIG. 4 is a block diagram showing a circuit which performs pseudo-frame photography and strobe-light emission control.

FIGS. 4 and 5 illustrate a circuit, as well as the operation thereof, for performing the pseudo-frame photography and strobe-light emission control described above.

The luminance of a subject to be photographed is measured by a photometric element 21, and the results of measurement are applied to a CPU 20. The CPU 20 decides the shutter speed (exposure time $T_A = T_B$) and the F-number based upon the measured luminance. The shutter speed may be applied to the CPU 20 manually.

In a case where the shutter speed $T_A$ is shorter than 1V, the CPU 20 outputs an electronic shutter-control signal TS which rises upon elapse of a time $(1V - T_A)$ from the trailing edge of a vertical synchronizing signal VD that appears after a shutter release button is pressed. The control signal TS is applied to an electronic shutter-control circuit 22.

A synchronizing signal generating circuit 23 generates the vertical synchronizing signal VD and a horizontal synchronizing signal VD and HD. These signals are applied to the electronic shutter-control circuit 22 and a CCD drive circuit 24. The width of the H-level portion of the synchronizing signal VD is 9H.

When the shutter-control signal TS enters the electronic shutter-control circuit 22, the latter generates an enable signal EN which rises in synch with the leading edge of the signal TS and decays in synch with the trailing edge of the next vertical synchronizing signal VD. The enable signal EN is applied to the CCD driver circuit 24. The electronic shutter-control circuit 22 further generates a control signal PP1 which rises upon a delay of 9H from the leading edge of the signal TS, and a control signal PP2 which rises upon a delay of 7H from the leading edge of the next vertical synchronizing signal VD. These signals PP1 and PP2 are applied to the CCD drive circuit 24 and a light-emission control circuit 25.

The CCD drive circuit 24 outputs a field-shift signal (pulse) FA, which is for clearing the A field of the CCD 10, in synch with the leading edge of the enable signal EN, and a field-shift signal (pulse) FB, which is for clearing the B field of the CCD 10, in synch with the leading edge of the control signal PP1. The CCD drive circuit 24 further outputs a field-shift signal (pulse) FA, which is for reading the A field of the CCD 10, in synch with the trailing edge of the next vertical synchronizing signal VD, and a field-shift signal (pulse) FB, which is for reading the B field of the CCD 10, upon a delay of 9H from the field-shift signal FA. The interval between these two field-shift pulses FA is the exposure time $T_A$, and the interval between these two field-shift pulses FB is the exposure time $T_B$.

The light-emission control circuit 25 outputs an L-level strobe-light emission control signal $\overline{Xon}$, which is applied to a strobe drive circuit 27, from the moment the inputted control signal PP1 rises until the moment the control signal PP2 rises. The strobe drive circuit 27 applies a trigger signal to a strobe discharge tube 28 at the leading edge of the signal $\overline{Xon}$, whereby the discharge tube 28 discharges the electric charge that has been stored in the main capacitor of the strobe drive circuit 27. The discharge tube 28 emits tube emits light as a result. At the trailing edge of the signal $\overline{Xon}$, a switching transistor 29 connected in series with the discharge tube 28 is turned off to forcibly halt the emission of light.

The width of the H-level portion of the vertical synchronizing signal VD is 9H, the signal PP2 rises upon a delay of 7H from the leading edge of the signal VD, and the strobe-light emission stops at the leading edge of the signal PP2. Accordingly, the strobe-light emission halts at a point in time 2H prior to the field shift pulse FA for reading the A field.

In the case where a dimmer strobe is used, a light-receiving element 26 is provided for receiving light reflected from a subject exposed to a strobe flash, and the timing at which the strobe-light emission is forcibly terminated (i.e., the timing at which the transistor 29 is turned off) is decided based upon an output signal from the light-receiving element 26. Then the light-emission control circuit 25 needs to only cause the control signal $\overline{Xon}$ to rise at whichever or the following timing occurs first: the timing of the leading edge of the control signal PP2 or the timing at which the strobe-light emission is halted by the dimmer strobe. The light-emission control circuit 25 can thus cause the emission of strobe light to halt.

In a case where the shutter speed $T_A(=T_B)$ is greater than 1V, the control signal TS should be made to rise at the elapse of time $[1V-(T_A-mV)]$ from the trailing edge of the vertical synchronizing signal VD [where m is a positive integer and is selected such that $(T_A-mV)$ is less than 1V]. In order for the m-number of vertical synchronizing signals that follow the trailing edge of the vertical synchronizing signal to be masked, at this time the control signal TS is held at the H level until the m-number of vertical synchronizing signals appear.

The timing at which the strobe-light emission is forcibly halted can be decided using a device such as a counter as well. For example, an arrangement can be adopted in which a value corresponding to the time $[T_A-(9H+2H)]$ is preset in a counter, the counter is counted down from the moment at which the exposure of the B field starts, and the emission of light is terminated when the value in the counter becomes zero.

As many apparently widely different embodiments of the present invention can be made without departing from the spirit and scope thereof, it is to be understood that the invention is not limited to the specific embodiments thereof except as defined in the appended claims.

What is claimed is:

1. A strobe control method for performing pseudo-frame photography in an image pick-up system comprising the steps of:
   (a) staggering, for a prescribed short period of time, the timings of clearing processing applied to photoelectric transducers of a first field and photoelectric transducers of a second field in solid-state electronic image sensing devices;
   (b) staggering, between the first and second fields and for said prescribed short period of time, the timings at which electric charges are read out from said photoelectric transducers;
   (c) controlling strobe-light emission in such a manner that a start timing of the strobe-light emission occurs after processing for clearing both said first and second fields; and
   (d) forcibly stopping the strobe-light emission for a requisite period of time before charge readout timing of said first field when a full emission period is longer than a common exposure time period, which corresponds to an exposure time period of said first and second fields overlapping, and when the strobe-light emission is to be continued for a time longer than said common exposure time period.

2. A strobe control method according to claim 1, further comprising the step of halting the strobe-light emission before a time, which corresponds to a first field storage time subtracted by 11 horizontal scanning intervals, has elapsed from a time when said second field is cleared.

3. A strobe control apparatus for performing pseudo-frame photography in an image pick-up system, comprising:
   first timing means for staggering, for a prescribed short period of time, the timings of clearing processing applied to photoelectric transducers of a first field and photoelectric transducers of a second field in solid-state electronic image sensing devices;
   second timing means for staggering, between the first and second fields and for said prescribed short period of time, timings at which electric charges are read out from said photoelectric transducer;
   start generating means for generating a strobe-light emission start command in response to a clearing signal of a field which is cleared second; and
   stop generating means for generating a strobe-light emission stop command for forcibly stopping strobe-light emission for a requisite period of time before charge readout timing of said first field when a full emission period is longer than a common exposure time period, which corresponds to an exposure time period of said first and second fields overlapping, and when the strobe-light emission is to be continued for a time longer than said common exposure time period.

4. A strobe control apparatus according to claim 2, further comprising halting means for halting the strobe-light emission before a time, which corresponds to a first field storage time saturated by 11 horizontal scanning intervals, has elapsed from a time when said second field is cleared.

* * * * *